United States Patent
Dittrich et al.

(10) Patent No.: US 6,325,175 B1
(45) Date of Patent: Dec. 4, 2001

(54) SHAFT SEAL FOR A REFRIGERANT COMPRESSOR

(75) Inventors: Guenter Dittrich, Greppin; Volker Pollrich, Schkeuditz, both of (DE)

(73) Assignee: Bitzer Kuehlmaschinenbau GmbH, Sindelfingen (DE)

( * ) Notice: Subject to any disclaimer, the term of this patent is extended or adjusted under 35 U.S.C. 154(b) by 0 days.

(21) Appl. No.: 09/550,524

(22) Filed: Apr. 17, 2000

Related U.S. Application Data

(63) Continuation of application No. PCT/EP98/06539, filed on Oct. 15, 1998.

(30) Foreign Application Priority Data

Oct. 17, 1997 (DE) .............................. 197 45 662

(51) Int. Cl.$^7$ .................................... F04B 39/02
(52) U.S. Cl. ................... 184/6.16; 277/394; 277/408; 277/552
(58) Field of Search .................. 184/6.16; 277/394, 277/358, 408, 429, 431, 552

(56) References Cited

U.S. PATENT DOCUMENTS

| | | |
|---|---|---|
| 1,848,595 | 3/1932 | Ackerman . |
| 4,284,280 * | 8/1981 | Bertram et al. .................. 277/30 |
| 4,371,173 * | 2/1983 | Kotzur ............................ 277/12 |
| 4,425,838 | 1/1984 | Pippert . |
| 4,619,458 | 10/1986 | Mitumaru . |
| 4,992,023 | 2/1991 | Baker et al. . |
| 5,028,205 * | 7/1991 | Kapadia et al. ................. 415/112 |
| 5,692,756 * | 12/1997 | Altieri . |
| 6,000,701 * | 12/1999 | Burgess ........................... 277/412 |
| 6,142,476 * | 11/2000 | Iwane ............................... 277/358 |

FOREIGN PATENT DOCUMENTS

| | | |
|---|---|---|
| 409 560 | 5/1935 | (BE) . |
| 944 794 | 6/1956 | (DE) . |
| 15 03 392 | 6/1966 | (DE) . |
| 2 250 947 | 10/1972 | (DE) . |
| 27 24 830 | 6/1977 | (DE) . |
| 250 562 | 6/1986 | (DE) . |
| 9170553 | 12/1996 | (JP) . |

* cited by examiner

Primary Examiner—David Fenstermacher
(74) Attorney, Agent, or Firm—Barry R. Lipsitz

(57) ABSTRACT

In order to improve a compressor for refrigerant, comprising a housing, at least one refrigerant-compressing element arranged in the housing, a shaft which has a section extending in the housing and driving the refrigerant-compressing element, a section passing through a wall of the housing and a drive section projecting out of the housing as well as a sealing arrangement effective between the section of the shaft passing through the wall and the housing and having a slide ring seal and an outer sealing ring, between which an oil receiving chamber is arranged, from which oil can be discharged via an oil outlet, in such a manner that, on the one hand, as little oil as possible leaks out and, on the other hand, as good a shut-off as possible in relation to the entry of air can be achieved it is suggested that an oil collecting area of the oil receiving chamber communicate via a siphon arrangement with an ascending channel which leads to an outlet for the oil.

20 Claims, 5 Drawing Sheets

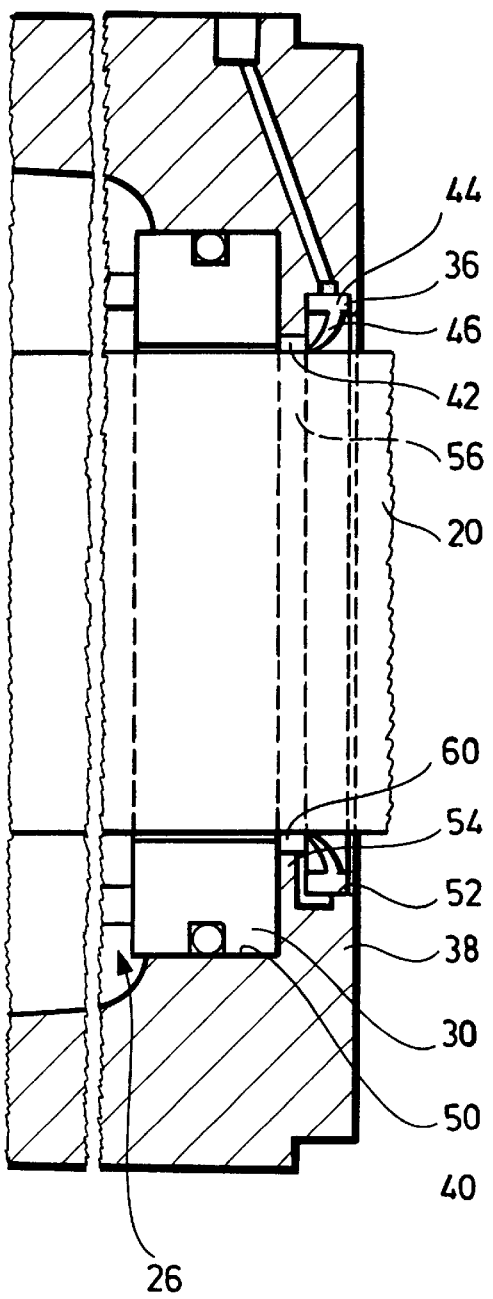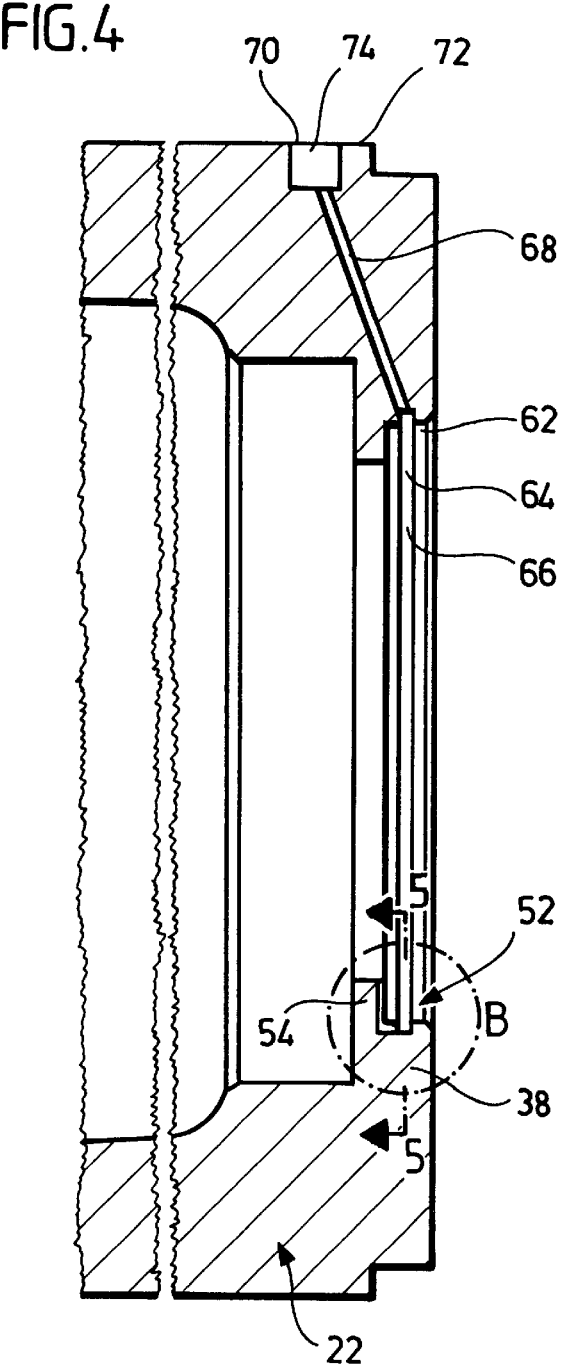

SHAFT SEAL FOR A REFRIGERANT COMPRESSOR

This application is a con of International Application No. PCT/EP98/06539 (Wo 99/20901) of Oct. 15, 1998, the entire specification of which is incorporated herein by reference.

The invention relates to a compressor for refrigerant, comprising a housing, at least one refrigerant-compressing element arranged in the housing, a shaft which has a section extending in the housing and driving the refrigerant-compressing element, a section passing through a wall of the housing and a drive section projecting out of the housing as well as a sealing arrangement effective between the section of the shaft passing through the wall and the housing, the sealing arrangement having a slide ring seal and an outer sealing ring, between which an oil receiving chamber is arranged, from which oil can be discharged via an oil outlet.

Compressors of this type are known from the state of the art. For example, it is provided for the oil to issue from the oil receiving chamber via an oil outlet, wherein the oil outlet is a channel leading to the outside directly from the oil receiving chamber.

Such a solution has the disadvantage that, on the one hand, appreciable amounts of oil can leak out and their collection must be taken care of and that, on the other hand, it is possible for air to enter the oil receiving chamber and also, via this, the interior of the compressor and cause corrosion.

SUMMARY OF THE INVENTION

The object underlying the invention is therefore to improve a compressor of the generic type in such a manner that, on the one hand, as little oil as possible leaks out and, on the other hand, as good a shut-off as possible in relation to the entry of air can be achieved.

This object is accomplished in accordance with the invention, in a compressor of the type described at the outset, in that an oil collecting area of the oil receiving chamber communicates via a siphon arrangement with an ascending channel which leads to an outlet for the oil.

The advantage of the inventive solution is to be seen in the fact that, on the one hand, air is prevented from entering to a great extent by the siphon arrangement and, on the other hand, the ascending channel following the siphon arrangement contributes to retaining the oil to as great an extent as possible in the oil collecting area and thus of allowing as little oil as possible to leak out when it is assumed that the ascending channel and the oil receiving chamber are filled via the siphon arrangement in accordance with the principle of communicating pipes.

In this respect, it is particularly expedient when the ascending channel is designed as an oil storage means. In this case, the ascending channel serves, in addition, to store oil passing through the siphon arrangement prior to exiting and thus creates the possibility, in addition, of retaining oil to a considerable extent and, where possible, not allowing it to leak out and, in particular, in the cases where an underpressure occurs in the interior of the compressor of seeing to it that the stored oil flows back into it again.

With respect to the design of the ascending channel, the most varied of possibilities are conceivable.

For example, it would be conceivable to design the ascending channel by way of a pipe introduced into the oil receiving chamber.

It is, however, particularly expedient when the ascending channel extends along a housing wall and thus requires as little space as possible so that no additional constructional space need be made available for the inventive solution.

A solution, with which the ascending channel extends in the housing wall, saves even more on space.

In order to give the ascending channel as large a volume as possible without this requiring a large cross section it is preferably provided for the ascending channel to be designed as an annular channel which surrounds the shaft and is thus, on the one hand, easy to arrange and, on the other hand, has a very large volume for storing oil on account of the annular encircling of the shaft.

For reasons of functional efficiency it is particularly favorable when the ascending channel is formed by two interacting elements which limit the ascending channel and so these elements merely need to be fitted together during the manufacture of the inventive compressor.

A particularly favorable solution provides for one of the elements to be a section of the housing wall and the other to be an insert member abutting on the section so that a further simplification of production results due to the fact that one of the elements can already be formed by a section of the housing wall and thus no separate part is required.

The ascending channel can be formed by the two elements particularly inexpensively when one of the elements has a groove. In this respect, it could, in principle, also be conceivable for the other element of the elements to have a groove and for both grooves together to form the ascending channel.

It is, however, even simpler when the other one of the elements covers the groove.

With respect to the position of the ascending channel itself, no further details have been given. It would, for example, be conceivable to form the ascending channel outside the housing preferably on parts to be arranged on it. It is, however, particularly advantageous when the ascending channel is located within an outer contour of the housing.

It is even more advantageous, in order not to alter the outer contour of the housing at all, when the elements interacting to form the ascending channel are both located within an outer contour of the housing.

A particularly favorable solution provides for one of the elements to be formed by the outer seal of the compressor so that, for this as well, no additional part need be mounted on the compressor but the seal which is present in any case can be used for limiting the ascending channel.

With respect to the design of the siphon arrangement, no further details have been given in conjunction with the preceding description of the individual embodiments. One advantageous solution, for example, provides for the siphon arrangement to comprise an oil bath shutting off an inlet of the ascending channel.

This oil bath is preferably formed in a recess located in front of the inlet into the ascending channel.

This recess is preferably provided in the housing wall in order not to have to use any additional components and thus to have a solution available which is inexpensive and as simple as possible to produce with parts which are present in any case.

In the simplest case, the recess is arranged such that it adjoins the groove forming the ascending channel and overlaps with it, wherein the inlet for the ascending channel is also formed by the overlapping.

With respect to the continuation of the ascending channel, no further details have been given in conjunction with the inventive solution described thus far. One advantageous embodiment, for example, provides for the ascending channel to open into an outlet channel leading to the outlet. As a result, the ascending channel does not lead directly out of the housing but this is ensured by an additional outlet channel and so the ascending channel can be arranged at the most favorable location irrespective of the position of the outlet.

In this respect, the outlet channel is preferably designed such that it passes through the housing, in particular, a housing wall thereof.

In order to prevent, in addition, any dirt penetrating the outlet channel, the outlet is closed by a member permeable to oil which is produced, in particular, from a porous material, such as, for example, felted or sintered metal or the like.

In order to counteract as comprehensively as possible any exiting of leakage oil based on the principle of communicating pipes, it is preferably provided for the outlet to be arranged on a side of the shaft located opposite the oil collecting area, preferably at a point of the housing located as high as possible, at least at the level of a maximum height of the oil receiving chamber and thus a considerable degree of filling of the oil receiving chamber is required in order to allow oil, in particular, leakage oil to issue from the outlet.

Additional features and advantages of the invention are the subject matter of the following description as well as the drawings illustrating several embodiments.

BRIEF DESCRIPTION OF THE DRAWINGS

FIG. 3 shows a sectional illustration, again enlarged in comparison with FIG. 2, in the area of a housing wall penetrated by the shaft;

FIG. 4 shows an illustration in accordance with FIG. 3 without elements of the slide ring seal and without the outer seal;

DETAILED DESCRIPTION OF THE INVENTION

Figure 1:
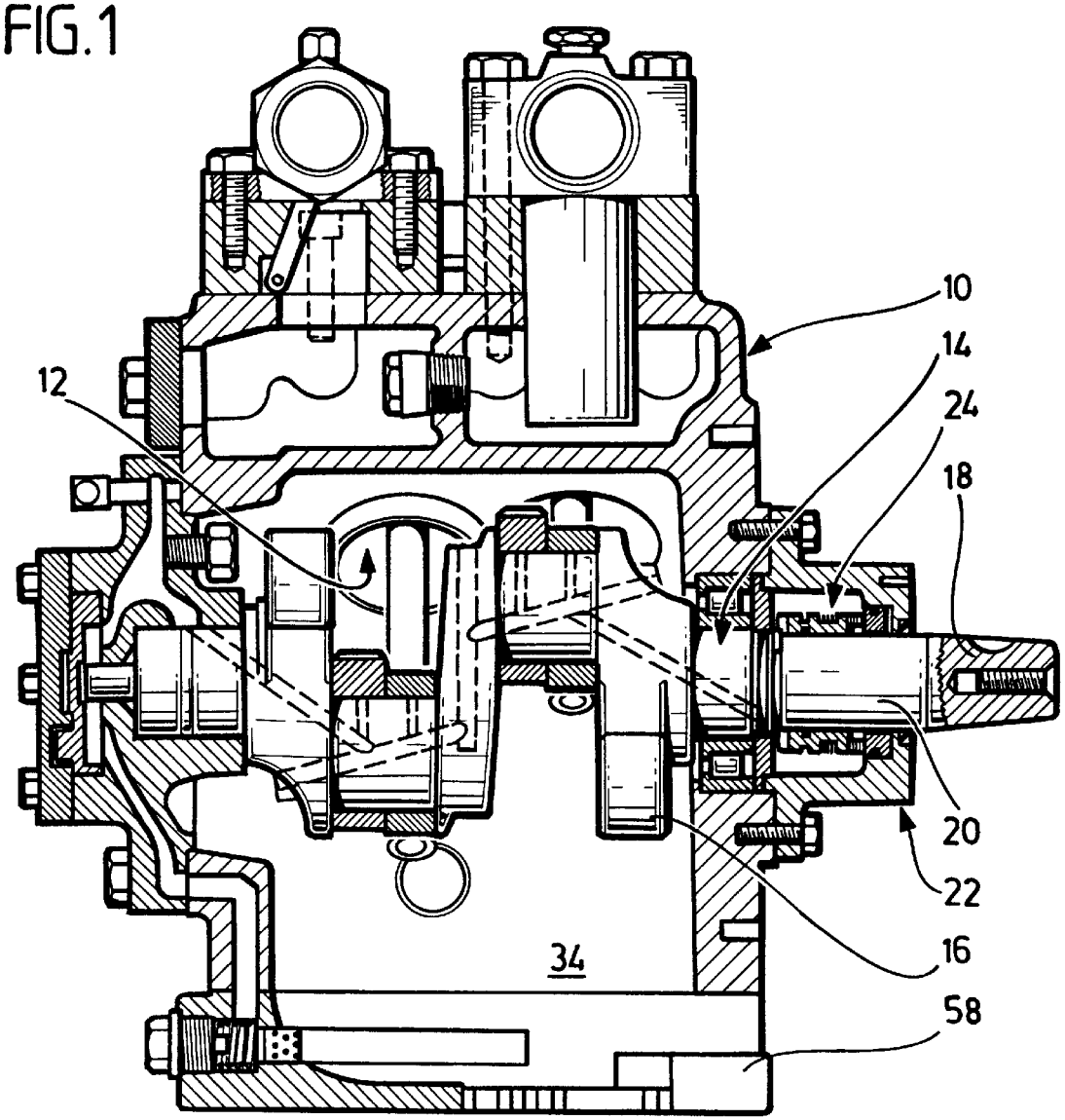
FIG. 1 shows a longitudinal section through a first embodiment of an inventive compressor.

One embodiment of an inventive compressor illustrated in FIG. 1 comprises a housing designated as a whole as 10, in which pistons 12 are movable in cylinders provided for them as refrigerant-compressing elements.

The pistons 12 are thereby driven by a shaft which is designated as a whole as 14, has a crankshaft section 16 and projects beyond one side of the housing 10 with a drive section 18. A section 20 of the shaft 14, which is sealed in relation to a cover plate 22 of the housing 10 by means of a sealing arrangement 24, is arranged between the crankshaft section 16 and the drive section 18.

Figure 2:
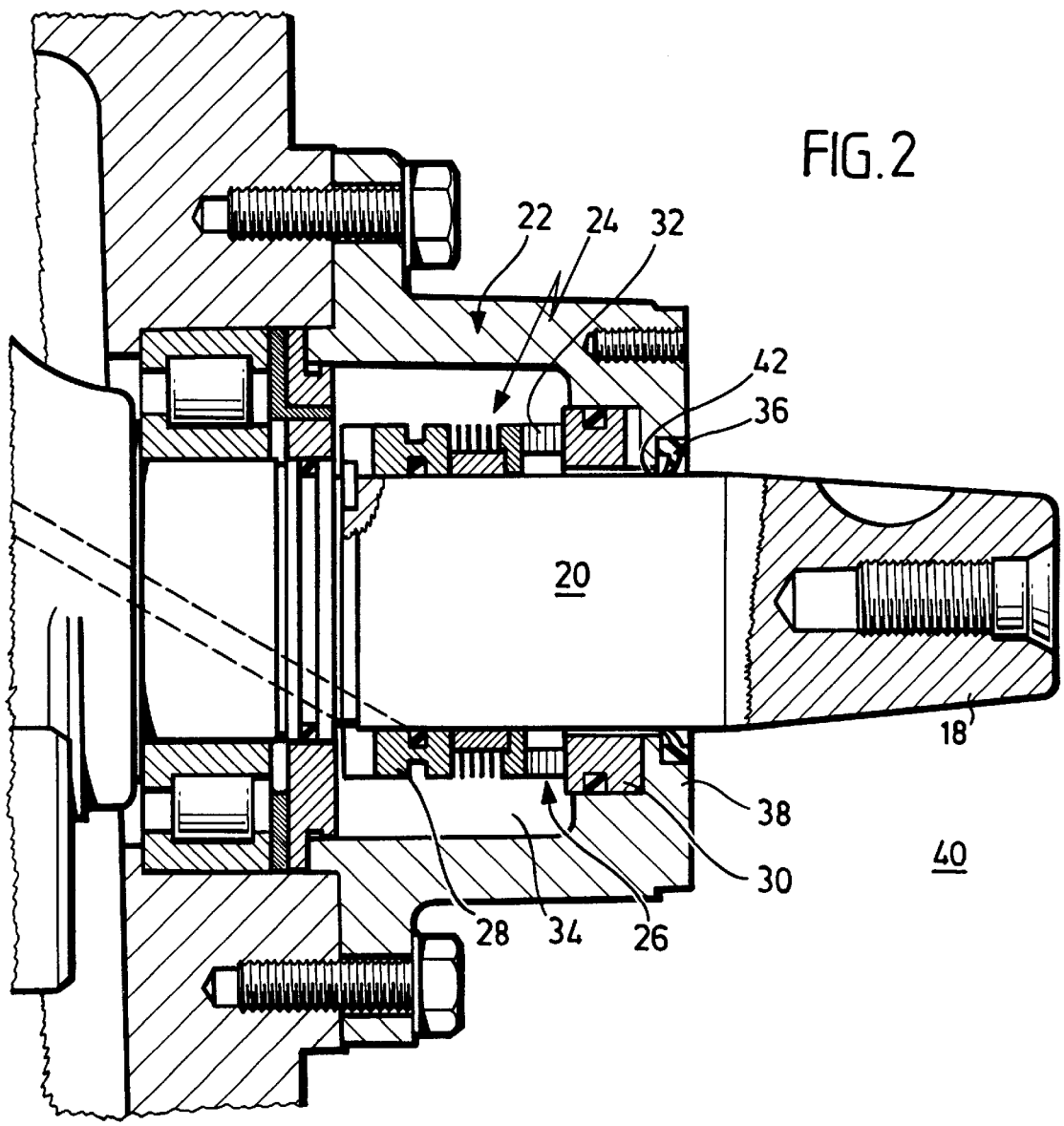
FIG. 2 shows an enlarged illustration of an inventive sealing arrangement between a shaft of the inventive compressor and a housing section.

As illustrated in FIG. 2, the sealing arrangement 24 preferably arranged in the cover plate 22 comprises a slide ring seal which is designated as a whole as 26 and has a unit 28 co-rotating with the section 20 of the shaft, a unit 30 non-rotatably seated in the cover plate 22 as well as a slide ring 32 which is effective between the rotating unit 28 and the stationary unit 30 in order to seal a housing interior 34 against oil leaking outwards.

Apart from the slide ring seal designated as 26, the sealing arrangement 24 comprises, in addition, an outer sealing ring 36 which is arranged in an outer wall 38 of the cover plate 22 of the housing penetrated by the section 20 of the shaft 14, namely on a side of the slide ring seal 26 facing away from the interior 34, and between the slide ring seal 26 and outer surroundings 40 of the housing 10 creates an additional seal between the housing 10 and the section 20 of the shaft 14 (FIG. 2).

The outer seal 36 is designed, for example, as a lip seal and comprises an annular sealing member 44, proceeding from which a sealing lip 46 extends in the direction of the section 20 of the shaft 14 and in the direction of the slide ring seal 26 and thus abuts on the section 20 in a reinforced manner during any increase in pressure in an oil receiving chamber 42 located between the slide ring seal 26 and the outer seal 36 and thus prevents any so-called "blow-through" through the outer seal 36.

As illustrated on an enlarged scale in FIG. 3, the stationary unit 30 of the slide ring seal is seated in a step-like seat 50 which is arranged on an inner side of the outer wall 38 of the cover plate 22.

Furthermore, an annular recess 52, which is open towards the outer side of the outer wall 38 and is of an annular and, in cross section, step-like design, is preferably provided for the outer seal 36, wherein the outer wall 38 has between the annular recess 52 and the step-like seat 50 on the outer wall 38 a flange 54 which points in the direction of the shaft 14 and limits with an inner cylinder surface 56 the free space designated as oil receiving chamber 42 between the flange 54 and the section of the shaft 14.

The oil receiving chamber 42 located between the stationary unit 30 of the slide ring seal 26 and the outer seal 36 and extending annularly around the section 20 of the shaft 14 forms at its lowest point facing an underside 58 of the housing an oil collecting area 60, in which the oil allowed through the slide ring seal 26, in particular, leakage oil is collected which has no chance to pass to the outside through the outer seal 36.

In order to provide a drainage possibility for this leakage oil in the case where it occurs in greater amounts, a circular-cylindrical outer surface 62 of the annular recess 52 is, as illustrated in FIG. 4, provided with a groove 64 which, as illustrated in FIG. 3, is closed by the annular sealing member 44 pressed into the annular recess 52 and thus forms a closed ascending channel 66 which surrounds the section 20 of the shaft 14 annularly and opens into an outlet channel 68 which, for its part, passes through the wall 38 of the cover plate 22 of the housing 10 and opens into an outlet 70 which is arranged above a highest point of the oil receiving chamber 42, for example, in an outer casing surface of the cover plate 22.

The outlet 70 is thereby of a broadened design in its cross section and accommodates, for its part, a closure element 74 permeable to oil, for example, a porous plug 74 designed, in particular, from a felt or sintered material.

Figure 5:
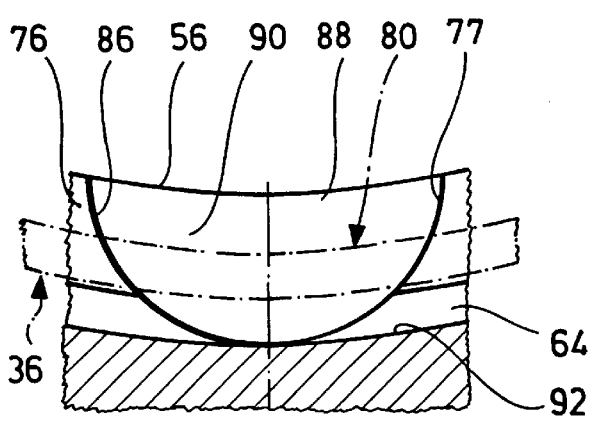
FIG. 5 shows a section along line 5—5 in FIG. 4.
Figure 6:
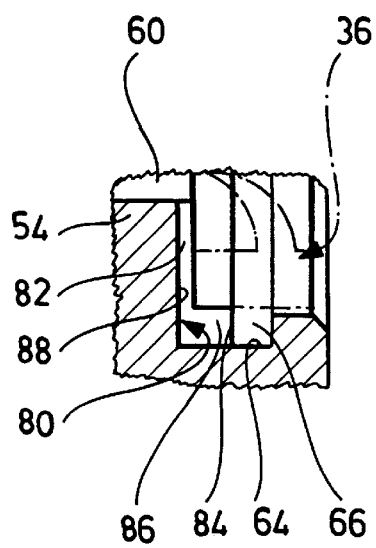
FIG. 6 shows an illustration, again enlarged, of an area B in FIG. 4.

In order to give the oil collecting in the oil collecting area 60 the possibility of entering the ascending channel 66, a pocket 80 locally widening the annular recess 52 is, as illustrated in FIGS. 5 and 6, milled into the flange 54, this pocket extending in a recessed manner into the flange 54 and the housing wall 38 in a radial direction to the shaft 14 in relation to the inner cylinder surface 56 of the circular-cylindrical outer surface 62 and in an axial direction to the shaft proceeding from the groove 64 as far as beyond an annular flange surface 76 of the annular recess 52 so that, as illustrated in FIGS. 3 and 6, a passage 82 remains between the outer seal 36 and the flange 54 in the area of the pocket 80, the oil from the oil collecting area 60 being able to pass through this passage into a sink limited by side walls 86, 88 of the pocket 80 and there form an oil bath 90, from which the oil can pass into the groove 64 and thus into the ascending channel 66 via an inlet opening 84 formed in an overlapping area between the pocket 80 and the groove 64.

The passage 82 thereby forms with the oil bath 90 closing the inlet opening 84 a siphon arrangement which forms an essentially gas-tight shut-off between the ascending channel 66 and the oil receiving chamber 42 even with oil exiting in small amounts and so no air and thus also no oxygen can penetrate into the oil receiving chamber 42 and thus from there through the slide ring seal 26 into the housing interior 34 of the compressor.

The pocket 80 is preferably provided in the lowest lying area of the annular recess 52 facing the lower part 58 of the housing 10 and extends in a radial direction in relation to the shaft 14 as far as a base 92 of the groove 64 and in axial direction in relation to the shaft 14 preferably proceeding from the groove 64 over a depth which is greater than a distance between the groove 64 and an annular flange surface 76 of the annular recess 52 which is formed by the flange 54.

A sufficiently wide passage 82 for oil collecting in the oil collecting area 60 thus remains between an end wall 88 of the pocket 80 and the outer seal 36.

The ascending channel 66 serves, in accordance with the invention, not only for allowing the oil entering it to ascend in the direction of the outlet channel 68 and, finally, the outlet 70 but also at the same time as an oil storage means for leakage oil from the oil collecting area 42 so that this can be stored prior to exiting from the outlet 70 in order to allow as little oil as possible to issue from the outlet 70.

Furthermore, this oil storage means formed by the ascending channel 66 has the additional advantage that during any occurrence of underpressure in the interior 34 of the compressor, which has an effect on the oil receiving chamber 43 through the slide ring seal 26, the oil bath 90 formed between the passage 82 and the inlet 84 of the groove 64 will also be supplied in this case with oil which then has the possibility, through this "siphon", of entering the oil receiving chamber 42 again and of lubricating the slide ring seal 26 on the secondary side, i.e. from the side of the oil receiving chamber 42.

Figure 8:
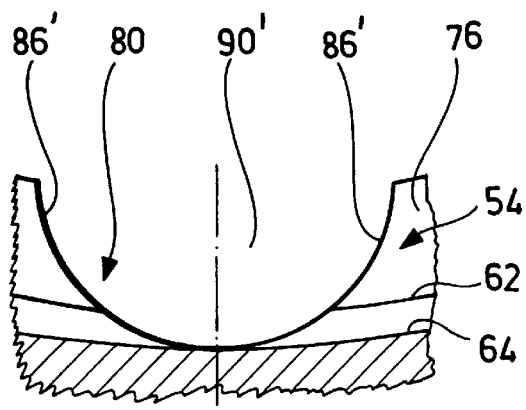
FIG. 8 shows a section similar to FIG. 5 through the second embodiment.
Figure 9:
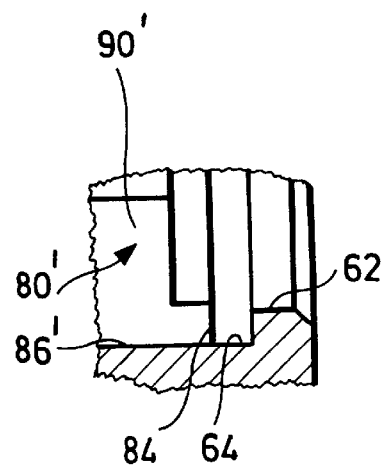
FIG. 9 shows a section similar to FIG. 6 through the second embodiment.
Figure 7:
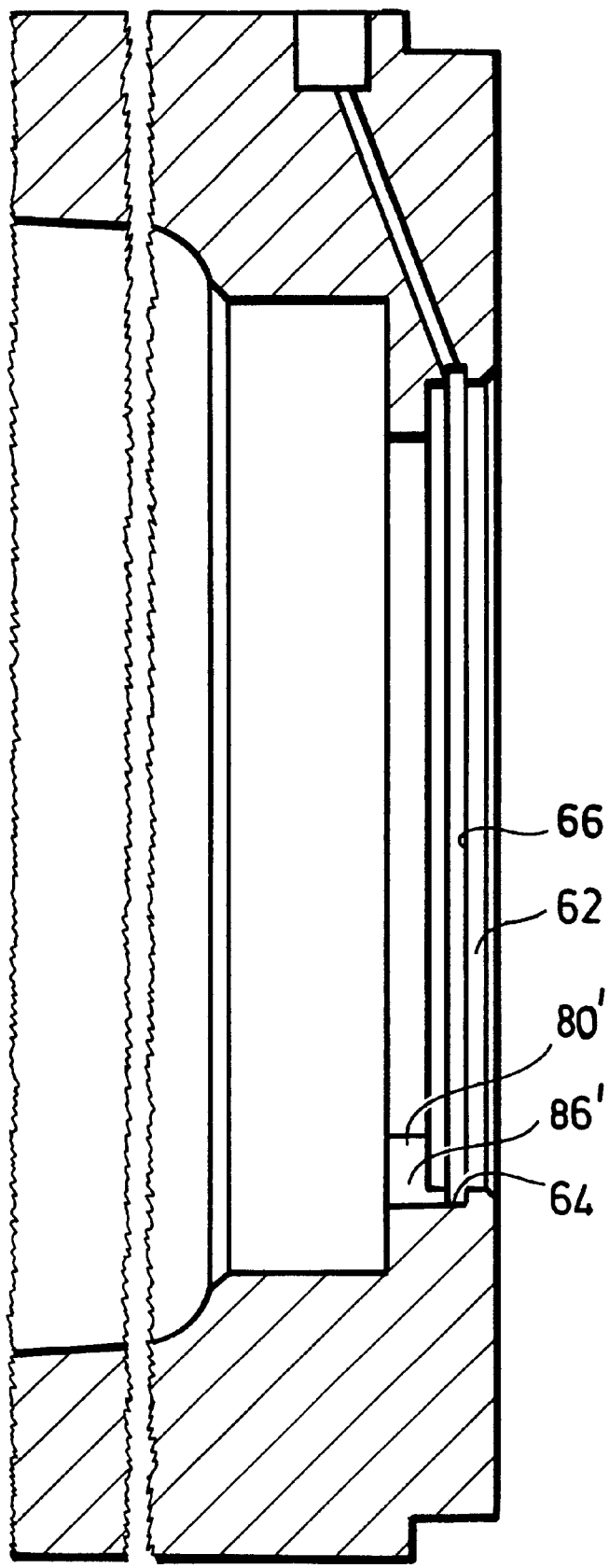
FIG. 7 shows a section similar to FIG. 4 through a second embodiment.

In a second embodiment of an inventive solution, illustrated in FIGS. 7 to 9, the pocket 80' is designed such that it penetrates the flange 54 completely and thus the side walls 86' of the pocket 80' extend as far as the stationary element 30 of the slide ring seal 26. As a result of the increase in size of the pocket 80', the oil bath 90' located beneath the oil collecting area 60' of the oil receiving chamber 42 also extends between the stationary element 30 and the outer seal 36, wherein a siphon arrangement is still created due to the transition from the pocket 80' via the inlet 84 into the groove 64 and this arrangement prevents any penetration of air into the oil receiving chamber 42 via the ascending channel 66.

As for the rest, those parts of the second embodiment which are identical to those of the first embodiment are given the same reference numerals and so reference is made in full to the comments concerning the first embodiment with respect to the description thereof.

What is claimed is:

1. Compressor for refrigerant, comprising:

a housing, at least one refrigerant-compressing element arranged in the housing, a shaft having a first section in the housing and driving the refrigerant-compressing element, a second section passing through a wall of the housing, and a drive section projecting out of the housing, a sealing arrangement effective between the second section of the shaft passing through the wall and the housing, said sealing arrangement having a slide ring seal and an outer sealing ring arranged on a side of said slide ring seal directed towards said drive section, and an oil receiving chamber being arranged between said slide ring seal and said outer sealing ring, said oil receiving chamber comprising an oil collecting area which communicates via a siphon arrangement with an ascending channel leading to an outlet for the oil by which oil is dischargeable from said oil receiving chamber.

2. Compressor as defined in claim 1, wherein the ascending channel is designed as an oil storage means.

3. Compressor as defined in claim 1, wherein the ascending channel extends along a housing wall.

4. Compressor as defined in claim 3, wherein the ascending channel extends in the housing wall.

5. Compressor as defined in claim 1, wherein the ascending channel is designed as an annular channel surrounding the shaft.

6. Compressor as defined in claim 1, wherein the ascending channel is formed by two interacting elements.

7. Compressor as defined in claim 6, wherein one of the elements is formed by a section of the housing wall and the other by an insert member abutting on the section of the housing wall.

8. Compressor as defined in claim 6, wherein one of the elements has a groove.

9. Compressor as defined in claim 8, wherein the other one of the elements covers the groove.

10. Compressor as defined in claim 6, wherein one of the elements is formed by the outer seal of the compressor.

11. Compressor as defined in claim 6, wherein the elements interacting to form the ascending channel are both located within an outer contour of the housing.

12. Compressor as defined in claim 1, wherein the ascending channel is located within an outer contour of the housing.

13. Compressor as defined in claim 1, wherein the siphon arrangement comprises an oil bath shutting off an inlet of the ascending channel.

14. Compressor as defined in claim 13, wherein the oil bath is formed in a recess located in front of the inlet of the ascending channel.

15. Compressor as defined in claim 14, wherein the recess is arranged in the housing wall.

16. Compressor as defined in claim 14, wherein the recess adjoins a groove forming the ascending channel and overlaps with it.

17. Compressor as defined in claim 1, wherein the ascending channel opens into an outlet channel leading to the outlet.

18. Compressor as defined in claim 1, wherein the outlet is closed by a member permeable to oil.

19. Compressor as defined in claim 1, wherein the outlet is arranged on a side of the shaft located opposite the oil collecting area.

20. Compressor as defined in claim 19, wherein the outlet is arranged at least at the level of a maximum height of the oil receiving chamber.

* * * * *